May 10, 1932.  H. BLUM ET AL  1,857,935
AUTOMOBILE SIGNAL SWITCH
Filed June 23, 1930
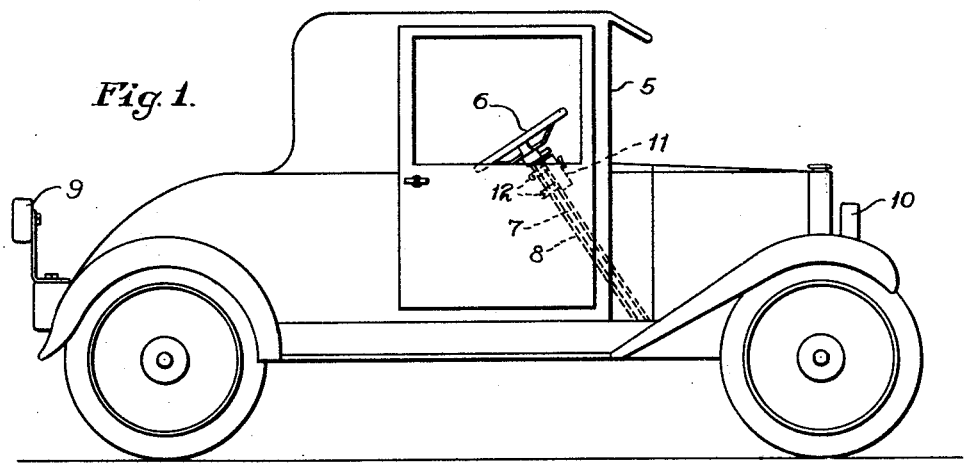
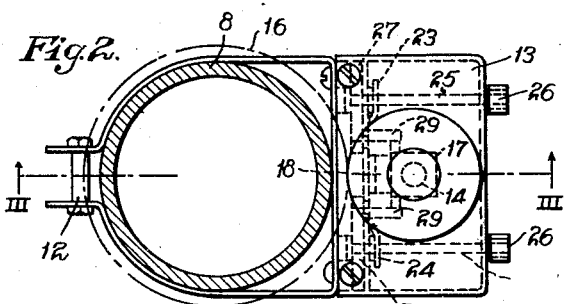
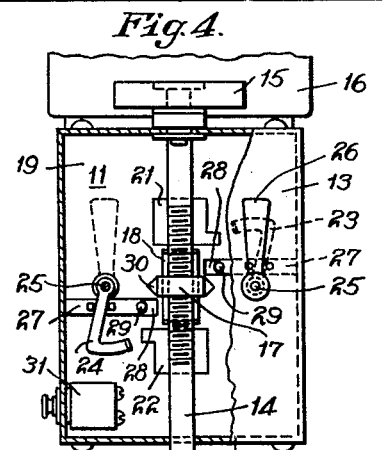
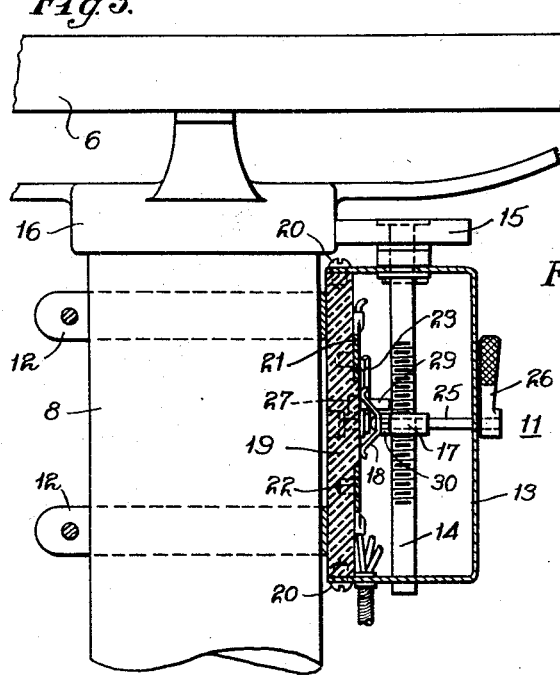
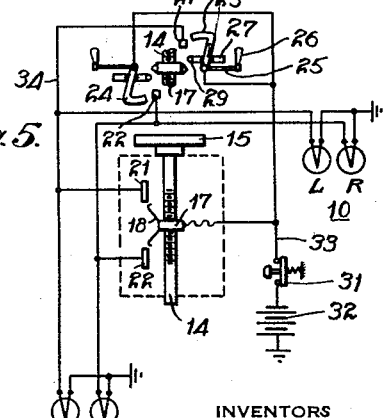
INVENTORS
Harry Blum
& Francis J. Farley,
By Archworth Martin,
Attorney.

Patented May 10, 1932

1,857,935

UNITED STATES PATENT OFFICE

HARRY BLUM AND FRANCIS J. FARLEY, OF McKEES ROCKS, PENNSYLVANIA

AUTOMOBILE SIGNAL SWITCH

Application filed June 23, 1930. Serial No. 463,198.

Our invention relates to direction indicators for automobiles and the like, and more particularly to mechanism for actuating signals for indicating a change in the direction of travel of an automobile.

One object of our invention is to provide means mounted on a steering post and actuated by movement of a steering wheel for automatically controlling the operation of direction signals.

Another object of our invention is to provide manually operable means for pre-selecting the desired signal, and which will be restored to "off" position upon turning movement of the wheel a predetermined degree in effecting a turn in the direction indicated.

Another object of our invention is to provide signal actuating mechanism of simplified and compact construction, and of improved arrangement of parts, which is attachable to the steering post where it will be easily accessible to the driver to operate for pre-indicating the desired change in direction of travel.

Still other objects will be apparent from the detailed description which follows, taken in conjunction with the drawings wherein Figure 1 is a side elevation of a motor car equipped with our invention; Fig. 2 is a sectional elevational plan view, on an enlarged scale, of the steering post and signal actuating mechanism of Fig. 1; Fig. 3 is a sectional view taken on the line III—III of Fig. 2; Fig. 4 is a face view, partly in section, of the apparatus of Fig. 3, and Fig. 5 is a diagrammatic view of the control circuit and apparatus.

In Fig. 1, an automobile 5 is provided with a steering wheel 6 which is mounted on a steering shaft 7, the steering shaft having connection with suitable steering mechanism of any well-known type and construction for controlling the direction of movement of the automobile. The steering shaft 7 is supported in a steering post 8 in any suitable manner. A suitable signalling device 9, such as lights or electrically-operated pointers, is mounted in any conspicuous position on the rear portion of the vehicle, and, if desired, another such device 10 may be mounted on the front portion of the vehicle, the signals 9 and 10, when actuated as hereinafter described, indicating to the traffic which direction the driver intends to turn at an intersection.

A signal actuating mechanism 11 is mounted on the steering post 8 adjacent to the steering wheel 6 by means of clamps 12. Referring to Figs. 2, 3 and 4, the mechanism 11 comprises a casing 13 in which is journaled a shaft 14. A friction roller or wheel 15, preferably of relatively soft rubber, is secured to the upper end of the shaft 14 and has frictional driving engagement with the hub 16 of the steering wheel 6, so that as the wheel is turned to steer the car the shaft 14 will be rotated. A traveling contact member or nut 17 has threaded engagement intermediate the ends of the shaft 14, and is held against rotation thereon by means of a spring contact finger 18 which bears against a base plate 19 formed of suitable insulating material. The base plate 19 is secured in the casing 13 by means of screws 20.

If desired, the roller 15 and the hub 16 of the steering wheel may be roughened or knurled to effect more positive driving engagement therebetween. Further, the screw operated movable contact member 17 results in a positive and reliable operation of the signals, since lost-motion of linkage ordinarily employed is eliminated. Also, the actuating mechanism 11 may be completely assembled as a unit, and easily installed on the steering post, any necessary adjustment between the steering mechanism and the mechanism 11 being accomplished by merely rotating the wheel 15.

Contact plates 21 and 22, electrically connected to the signalling devices 9 and 10, are mounted on the base plate 19 in position parallel with the axis of the shaft 14, and spaced apart such distance to provide slight clearance between the ends of the contact finger 18 and the adjacent ends of the plates. This clearance provides for the normal straight ahead driving without causing operation of the signalling devices through slight manipulation of the steering wheel. However, in deviating from a straight course to a substantial extent, rotation of the shaft 14 causes the member 17 to travel therealong, thereby causing the contact finger 18 to engage with either the contact plate 21 or the contact plate 22, dependent, of course, on the direction of the change of travel. It will be seen that the engagement between the contacts 18 and 21, or the contacts 18 and 22, will be maintained until the steering wheel is returned to straight ahead driving position, movement of the steering wheel causing the return of the member 17 to intermediate position between the contact plates 21 and 22.

In order to pre-indicate an intended turn to the traffic, switch arms or movable contacts 23 and 24 are provided. These switches are manually operable into position to cause operation of the signalling devices 9 and 10, and are automatically returned to "off" position through manipulation of the steering wheel. Each switch arm is mounted on a rod 25 that is pivotally supported in the base plate 19 and extends through the casing 13, and is provided with a lever 26 by means of which the switch arm can be moved into and out of contacting position.

As shown more clearly in Figs. 3 and 4, the switch arms 23 and 24, and their operating connections, are positioned at opposite sides of the screw shaft 14 and adjacent to the contact member 17 when in its intermediate position on the shaft; the switch arm 23 being movable into engagement with the contact plate 21, and the switch arm 24 being movable into engagement with the contact plate 22, thereby to complete the circuit to the signalling devices. Each of the switch arms 23 and 24 has pivotal connection with a transversely slidable bar 27 which is slidably supported in a groove 28 in the base plate 19. An upwardly projecting pin 29 is suitably secured to one end of the bar 27, and is movable into the path of travel of the member 17 on the screw shaft 14. The member 17 is provided with cam portions 30 to engage with the pin 29 and move the bar 27 outwardly.

When the switch arm 24, for example, is moved into position to engage the contact plate 22, the bar 27 is moved inwardly to position the pin 29 in the path of travel of the member 17. The switch arm is automatically returned to its "off" position upon movement of the steering wheel to effect the turn indicated by the engagement of the switch arm 24 with the plate 22 through movement of the member 17 which causes the portion 30 thereof to engage the pin 29, thereby to cam the bar 27 outwardly which moves the switch arm 24 out of contact with the plate 22.

Due to the spring tension of the switch arms 23 and 24 on the cooperating contact plates and the base plate 19, they are maintained in the last-operated position until again moved; however, other types of locking means may be utilized to hold the switch in their "on" and "off" positions.

Each of the switch arms 23 and 24 is manually movable into its "on" position to pre-indicate an intended turn, and the switch is automatically returned to its "off" position upon movement of the steering wheel to effect the turn in the manner above described. The switch may be manually returned to its "off" position in case the driver decides not to make the turn indicated. With the switches 23 and 24 in their "off" position, the steering wheel may be rotated and the signalling devices will be automatically actuated by the contact member 17.

Another advantage of our invention resides in the provision of a switch 31, which may be termed a cut-out switch. This switch may be mounted at any convenient position, but is shown as being mounted in the casing 13, Fig. 4. Normally, the switch 31 is closed and the battery circuit is completed therethrough to the signalling devices, but, under certain conditions it may be desirable to prevent the operation of the signalling devices thereby to save drain on the battery. For example, if the car is parked with the front wheels turned, the switch 31 may be operated to its "off" position thereby opening the battery circuit to the signalling devices.

Referring now to Fig. 5, the operation of the invention will be described. Assuming that the driver desires to signal his intention to turn left; before reaching the point where the turn is to be made, the driver will rotate the lever 26 thereby moving the switch arm 23 into engagement with the contact plate 21. Movement of the arm 23 causes the rod 27 to be moved inwardly with the pin 29 positioned in the path of travel of the nut 17. For clearness of illustration, the manual control apparatus has been shown separated from the automatic control apparatus, but, similar parts are identified with the same numerals and are to be arranged as shown in Fig. 4.

By the engagement of the contact arm 23 and the plate 21, there is a circuit completed for energizing the front and rear signalling devices, extending by way of positive battery 32, normally closed contacts of the cut out switch 31, conductor 33, switch arm 23, contact plate 21, conductor 34, left hand signal devices L at the front and rear, to ground. The negative side of the battery 32 being grounded to the frame of the car, the above-traced circuit will energize the front and rear signalling devices L of the devices 9 and 10.

A signal is given to the traffic, ahead and rear, by the operation of suitable signalling devices, such as lights or electrically-operated pointers.

While negotiating the turn, the screw shaft 14 is rotated by movement of the steering wheel, thereby moving the contact member 17 upwardly therealong into engagement with the contact plate 21 which completes a parallel circuit for the signalling devices L. This circuit extends from the battery 32, contacts of the switch 31, conductor 33, flexible lead 35 of the movable contact member 17, spring contact 18 thereof, contact plate 21, conductor 34, to the signals and to ground.

The above-traced circuit remains completed until the turn has been completed and the steering mechanism returned to normal straight ahead driving position, thus continuing the signal until completion of the turn.

Following the completion of the above-traced parallel circuit for the signalling devices, further movement of the member 17 along the shaft 14 causes the cam portion 30 to engage the pin 29, thereby to move the bar 27 outwardly which moves the switch arm 23 out of engagement with the contact plate 21 and opening, at this point, the first traced circuit for the signals.

If another signal is to be given to the traffic, either to the right or left, the lever 26 for either right or left turn is operated, and the signal is given as described; the signal for the right turn being the same as the left turn except the right hand lever 26 will be operated and the signalling devices R at the front and rear of the car will be energized, the contact member 17 moving downwardly to reset the switch lever 26 and to continue the signal until completion of the turn.

We claim as our invention:—

1. Circuit-controlling apparatus for signal lamps and the like comprising a screw-threaded shaft, means for rotating said shaft, a movable contact member having screw-threaded engagement with the shaft, a pair of stationary contact members positioned to be engaged by the movable contact member during traveling movement thereof along the shaft, a manually-operable switch movable into engagement with each of said stationary contact members, and a bar connected at one end to each of the said switches, the other end of each bar extending into the path of movement of the said movable contact member whereby the bars may be moved to actuate the said switches.

2. Circuit-controlling apparatus for signal lamps and the like comprising a screw-threaded shaft, means for rotating said shaft, a movable contact member having screw-threaded engagement with the shaft, a stationary contact member positioned to be engaged by the movable contact member, a manually-operable switch movable to close a circuit through the stationary contact member, and a bar slidably supported and having connection with the said switch and provided with a projection extending into the path of travel of the movable contact member, the last-named member being provided with a camming surface for shifting the bar to effect operation of the switch at a predetermined point in the path of travel of the movable contact member.

3. Circuit-controlling apparatus comprising a casing, a screw shaft journalled in said casing, a movable contact member having threaded engagement with the said shaft, a pair of stationary contact members mounted in the casing at points spaced longitudinally of the shaft, and a bar slidably supported in the casing at points adjacent to each of the stationary contact members and extending transversely of the shaft, switch members movable into and out of engagement with the stationary contact members and each having connection with one of said bars, and camming surfaces on the movable contact member positioned to engage the bars and shift them in directions laterally of the shaft to thereby actuate said switches during travel of the said movable contact member.

In testimony whereof we, the said HARRY BLUM and FRANCIS J. FARLEY have hereunto set our hands.

FRANCIS J. FARLEY.
HARRY BLUM.